(12) United States Patent
Abbisso et al.

(10) Patent No.: US 6,678,670 B2
(45) Date of Patent: Jan. 13, 2004

(54) NON-INTEGER ORDER DYNAMIC SYSTEMS

(75) Inventors: Salvatore Abbisso, Augusta (IT); Riccardo Caponetto, Catania (IT); Olga Diamante, Syracuse (IT); Domenico Porto, Pedara (IT); Eusebio Di Cola, Messina (IT); Luigi Fortuna, Syracuse (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 180 days.

(21) Appl. No.: 10/036,300

(22) Filed: Dec. 26, 2001

(65) Prior Publication Data

US 2002/0133243 A1 Sep. 19, 2002

(30) Foreign Application Priority Data

Dec. 27, 2000 (EP) ............................................. 00128558

(51) Int. Cl.[7] .......................... G06F 15/00; G06F 15/18
(52) U.S. Cl. ........................................ 706/44; 706/41
(58) Field of Search ..................................... 706/44, 41

(56) References Cited

U.S. PATENT DOCUMENTS

| | | | | |
|---|---|---|---|---|
| 5,111,531 A | * | 5/1992 | Grayson et al. | ............... 706/23 |
| 5,625,552 A | | 4/1997 | Mathur et al. | ................ 700/42 |
| 6,578,018 B1 | * | 6/2003 | Ulyanov | ...................... 706/14 |

FOREIGN PATENT DOCUMENTS

FR 00274729 A1 * 10/1997

OTHER PUBLICATIONS

Pei et al, "Approximate Nolinear System Linearization with Neural Networks", IEEE Proceedings of the American Control Conference, Jun. 1997.*
Arena et al., "CNN with Non–Integer Order Cells" 1998 Fifth IEEE International Workshop on Cellular Neural Networks and Their Applications, Apr. 14, 1998, pp. 372–378, XP0009997823.
Podlubny, "Fractional–Order Systems and PID–Controllers" IEEE Transactions on Automatic Control, vol. 44, No. 1, Jan. 1999, pp. 208–214, XP000997841.

* cited by examiner

*Primary Examiner*—George B. Davis
(74) *Attorney, Agent, or Firm*—Lisa K. Jorgenson; Allen, Dyer Doppelt, Milbrath & Gilchrist, P.A.

(57) ABSTRACT

A circuit implementing a non-integer order dynamic system includes a neural network that receives at least one input signal and generates therefrom at least one output signal. The input and output signals are related to each by a non-integer order integro-differential relationship through the coefficients of the neural network. A plurality of such circuits, implementing respective non-integer order controllers can be interconnected in an arrangement wherein any of the integral or differential blocks included in one of these circuits generates a signal which is fed to any of the integral or differential blocks of another circuit in the system.

40 Claims, 16 Drawing Sheets

NON-INTEGER ORDER DYNAMIC SYSTEMS

FIELD OF THE INVENTION

The present invention relates to dynamic systems, and more particularly to non-integer order dynamic systems such as, for example, proportional, integral, and derivative (PID) controllers.

BACKGROUND OF THE INVENTION

The idea of fractional integro-differential operators (i.e., derivatives and integrals) seems to be a somewhat unusual topic, and is very hard to explain due to the fact that, unlike commonly used differential operators, it is not related to some direct geometrical meaning, such as the trend of functions or their convexity.

A number N of first order differential equations usually model complex dynamics. In system theory, we call N the degree of the system. Moreover, the theory of Laplace transforms in linear systems provides the possibility of analyzing the input-output relationship of a system via the ratio of its Laplace transform, which is called the transfer function of the system and whose denominator is a polynomial of degree N.

For that reason, such a mathematical tool could be judged far from reality. But many physical phenomena have an intrinsic fractional order description, and fractional order calculus is necessary to explain them. In fact, some physical phenomena exist whose analysis involves transfer functions of degree m, with m being a non-integer number.

Transmission lines, various kinds of electrical noises, dielectric polarization and heat transfer phenomena are some of the fields involving non-integer order physical laws. Evidence of this is provided in the following articles: J. C. Wang, "Realization Of Generalized Warburg Impedance With RC Ladder And Transmission Lines", J. Electrochem. Soc., vol. 134, No. 8, pp. 1915–1940, 1987; M. S. Keshner, "1/f Noise", Proceedings of the IEEE, vol. 70, No. 3, pp. 212–218, March 1982; B. Mandelbrot, "Some Noises With 1/f Spectrum, A Bridge Between Direct Current And White Noise", IEEE Trans. Inform. Theory, vol. IT-13, No. 2, pp. 289–298, 1967; P. Arena, R. Caponetto, L. Fortuna and D. Porto, "Nonlinear Norder Circuits And Systems: An Introduction", Nonlinear Science, Series A, Vol. 38. World Scientific; A. Le Mehaute', "Fractal Geometries", CRC Press Inc. Boca Raton—Ann Arbor—London, 1991; and B. Onaral, H. P. Schwan, "Linear And Non-linear Properties Of Platinum Electrode Polarization, Part I, Frequency Dependence At Very Low Frequencies" Met. Bio. Eng. Comput., vol. 20, pp. 299–306, 1982.

Following, for instance, K. B. Oldham, J. Spanier, "Fractional Calculus", Academic Press, N.Y., 1974 or B. Ross, Editor, "Fractional Calculus And Its Applications", Berlin: Springer Verlag, 1975, the most common definition of a non-integer order integral is the following:

$$\frac{d^{-q} f(t)}{dt^{-q}} = \frac{1}{\Gamma(q)} \int_0^t (t-\tau)^{q-1} f(\tau) d\tau \tag{1}$$

The lower limit is chosen to be zero (it could be any real number) because in the following, time series with t>0 will be considered. In the above definition, $\Gamma(q)$ is the factorial function defined for a positive real value q, by the following expression:

$$\Gamma(q) = \int_0^\infty x^{q-1} e^{-x} dx \tag{2}$$

for which, when q is an integer, it holds that:

$$\Gamma(q+1) = q! \tag{3}$$

The definition of fractional derivative easily derives from (1) by taking an n order derivative (n being a suitable integer) of an m order integral (m suitable non-integer) to obtain an n−m=q−order one:

$$\frac{d^q f(t)}{dt^q} = \frac{d^{n-m} f(t)}{dt^{n-m}} = \frac{d^n}{dt^n}\left[\frac{d^{-m} f(t)}{dt^{-m}}\right] = \frac{1}{\Gamma(m)} \frac{d^n}{dt^n} \int_0^t (t-\tau)^{m-1} f(\tau) d\tau \tag{4}$$

SUMMARY OF THE INVENTION

In view of the foregoing background, an object of the present invention is to provide a circuit arrangement adapted to implement non-integer order dynamic systems, such as, e.g., non-integer order PID controllers.

This and other objects, advantages and features in accordance with the present invention are provided by a circuit for implementing a non-integer order dynamic system, wherein the circuit comprises a neural network for receiving at least one input signal and for generating therefrom at least one output signal. The at least one input and output signals are preferably related to each other by a non-integer order integro-differential relationship through coefficients of the neural network.

The circuit may further include at least one input layer register for receiving the input signal, and at least one neuron comprising at least one adder block for calculating an input thereof based on the at least one input signal and a respective set of coefficients. The at least one neuron may comprise at least one weighing function block for computing an output thereof based upon a respective weighing function. The weighing function may be based upon a sigmoidal function. At least one output layer adder circuit may be used for calculating the at least one output of the neural network from outputs of the at least one neuron.

The at least one neuron may comprise a plurality of neurons, and the circuit further comprises a multiplexer for applying respective weighing functions to the plurality of neurons.

Another embodiment of the present invention is directed to a non-integer order proportional, integral and differential (PID) controller comprising a neural network for receiving at least one input signal and for generating therefrom at least one output signal. The at least one input and output signals are preferably related to each other by a non-integer order integro-differential relationship through coefficients of the neural network.

The PID controller further comprises a proportional block for adding to the at least one output signal an input signal component subject to a proportional weighing coefficient, an integral block for adding to the at least one output signal a non-integer integral signal component subject to an integral weighing coefficient, and a derivative block for adding to the at least one output signal a non-integer derivative signal component subject to a derivative weighing coefficient.

A first input register may be associated with the integral block for feeding an output of the integral block back to an input of the neural network, and a second input register may be associated with the derivative block for feeding an output of the derivative block back to the input of the neural network.

Yet another embodiment of the present invention is directed to a system comprising a plurality of non-integer order PID controllers connected together as defined above. In particular, at least one of the integral and derivative blocks in one of the plurality of PID controllers generates at least one respective output signal which is fed to at least one of the integral and derivative blocks in another PID controller.

Another aspect of the present invention is directed to a method for implementing a non-integer order dynamic system. The method preferably comprises receiving at least one input signal using a neural network and for generating therefrom at least one output signal, the at least one input and output signal being related to each other by a non-integer order integro-differential relationship through coefficients of the neural network.

BRIEF DESCRIPTION OF THE DRAWINGS

The invention will now be described, purely by way of example, with reference to the annexed drawings, wherein.

DETAILED DESCRIPTION OF THE PREFERRED EMBODIMENTS

Figure 1:
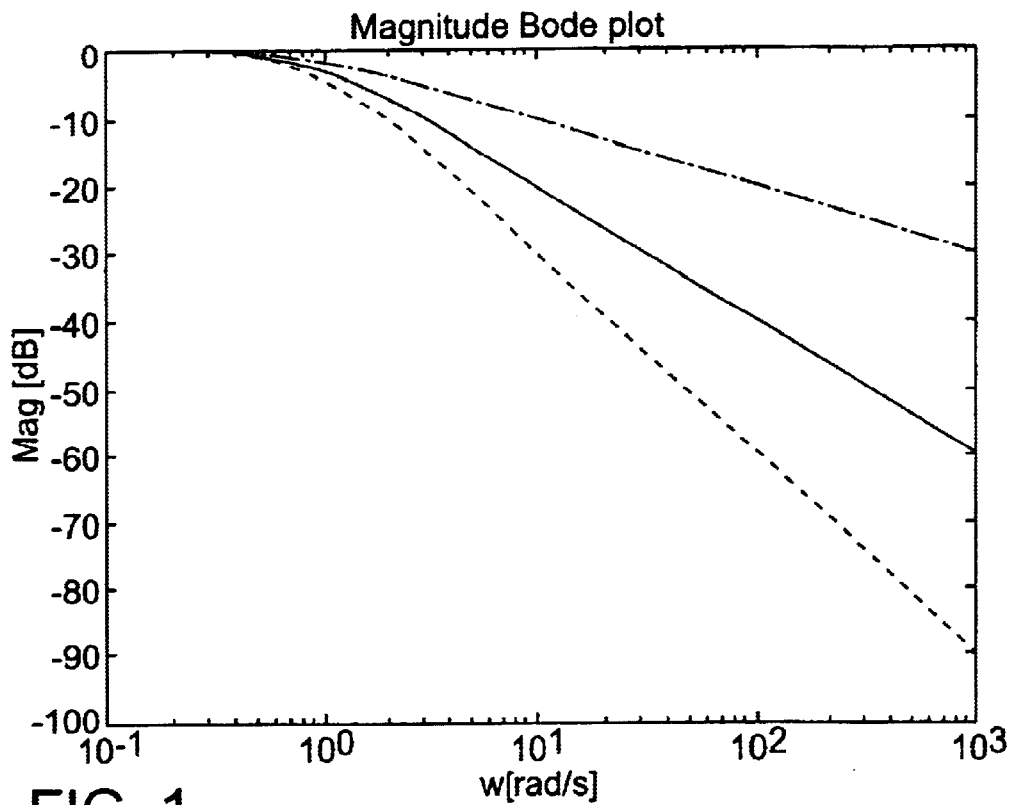
FIG. 1 shows some examples of magnitude Bode plots of fractional systems in accordance with the present invention.

By way of introduction to the description of a preferred embodiment of the invention, the basic underlying theoretical principles of the invention will be briefly discussed. It is now useful to introduce the most important features of fractional systems. They will be discussed using the same tools usually adopted for integer order systems which allow an easy comparison among the two different behaviors.

For example, let us focus on Bode diagrams, that is, one of the basic tools in system and control theory. By considering the following equation:

$$F(s) = \frac{k}{\left(\frac{s}{p}+1\right)^m} \quad (5)$$

and assuming $s=j\omega$, we obtain:

$$F(j\omega) = \left[\frac{k^{1/m}}{(j\omega/p+1)}\right]^m = \quad (6)$$

$$\left[\left|\frac{k^{1/m}}{(j\omega/p+1)}\right|e^{j\varphi\left[\frac{k^{1/m}}{(j\omega/p+1)}\right]}\right]^m = \left|\frac{k^{1/m}}{(j\omega/p+1)}\right|^m e^{jm\varphi\left[\frac{k^{1/m}}{(j\omega/p+1)}\right]}$$

and, therefore the magnitude expressed in decibels is $$|F(j\omega)|_{dB} = \quad (7)$$

$$20\log_{10}\left[\frac{k^{1/m}}{\sqrt{\omega^2/p^2+1}}\right]^m = 20\log_{10}k - 20m\log_{10}\sqrt{\omega^2/p^2+1}$$

It must be noted that, if $\omega \to \infty$, (7) becomes $-20\,m\log_{10}(\omega/p)$ resulting, in a semi-logarithmic plane, in a line having slope $-20\,m$ dB/dec (instead of 20 dB/dec for first order systems). This fact is useful to plot an asymptotic diagram whose maximum error $e_{max}$ can be found close to the pole $\omega=-p$. This error can be calculated as follows:

$$e_{max} = ||F(jp)|_{dB,app} - |F(jp)|_{dB}| = \quad (8)$$

$$\left|-20m\log_{10}\frac{\omega}{p}\bigg|_{\omega=p} - \left(-20m\log_{10}\sqrt{\frac{\omega^2}{p^2}+1}\right)_{\omega=p}\right| \cong 3m \text{ dB}$$

while for first order systems this value is 3 dB. Examples of magnitude Bode diagrams are reported in FIG. 1, which shows magnitude Bode plot of fractional system $F(s)=1/(s+1)^m$ for m=1 (solid), m=0.5 (dashed), m=1.5 (dotted).

It is quite evident that the fractional order m modulates the slope of the magnitude diagram, providing a parameter useful, e.g., for the open loop synthesis of a controller. Regarding the phase displacement, it must be noted that, considering the exponent of expression (6), it holds that:

$$\varphi[F(j\omega)] = m\varphi\left[\frac{k^{1/m}}{j\omega/p+1}\right] = m\varphi\left[\frac{1}{j\omega/p+1}\right] = -marctg\frac{\omega}{p} \quad (9)$$

Figure 2:
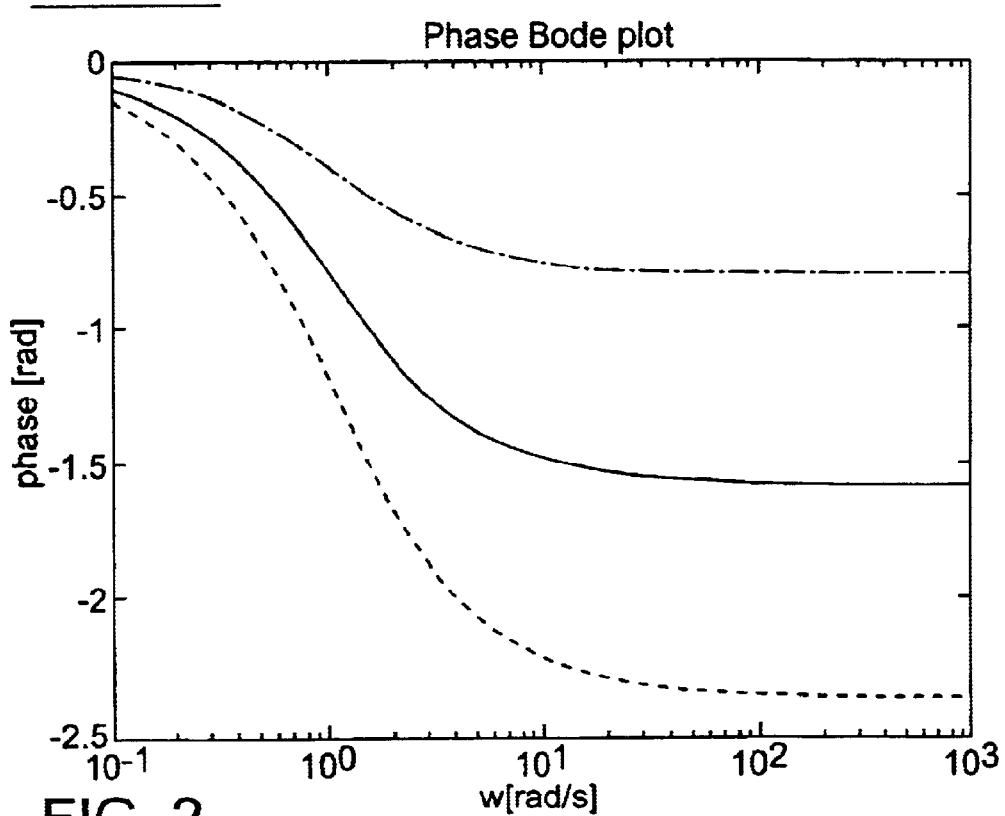
FIG. 2 shows some examples of corresponding phase diagrams with respect to FIG. 1.

Expression (9) shows that m modulates the scale of the phase law. In fact, it can be easily seen that for $\omega \to \infty$ the phase angle approaches $-m p/2$ instead of $-p/2$ which is typical of first order systems. Examples of phase diagrams are depicted in FIG. 2, which shows the phase Bode plot of fractional system $F(s)=1/(s+1)^m$ for m=1 (solid), m=0.5 (dashed), m=1.5 (dotted).

Let us now consider the impulse canonical responses. Taking into account the Laplace transformation, the following relations hold:

$$L\left\{\frac{d^q f(t)}{dt^q}\right\} = s^q L\{f(t)\} - \sum_{k=0}^{n-1} s^k \left[\frac{d^{q-1-k} f(t)}{dt^{q-1-k}}\right]_{t=0} \quad (10)$$

where n is an integer such that n−1<q<n. The above expression becomes very simple if all the derivatives are zero:

$$L\left\{\frac{d^q f(t)}{dt^q}\right\} = s^q L\{f(t)\} \quad (11)$$

Expression (11) is very useful in order to calculate the inverse Laplace transform of elementary transfer functions, such as non-integer order integrators ($1/s^q$). In fact, replacing q with −q and considering f(t)=s(t), the Dirac impulse, by means of the definition (1), it holds that:

$$L\left\{\frac{t^{q-1}}{\Gamma(q)}\right\} = \frac{1}{s^q}; \quad L^{-1}\left\{\frac{1}{s^q}\right\} = \frac{t^{q-1}}{\Gamma(q)} \quad (12)$$

is the impulse response of a non-integer order integrator. Another important result can be derived by the well known frequency translation formula $L^{-1}\{F(s+a)\}=e^{-at}L^{-1}\{F(s)\}$ applied to (12)

$$L^{-1}\left\{\frac{1}{(s+a)^q}\right\} = \frac{t^{q-1}e^{-at}}{\Gamma(q)} \quad (13)$$

From (13) the following expression for impulse response can be written:

$$f(t) = L^{-1}\left\{\frac{k}{(s/p+1)^m}\right\} = L^{-1}\left\{\frac{kp^m}{(s+p)^m}\right\} = kp^m \frac{t^{m-1}e^{-pt}}{\Gamma(m)} \quad (14)$$

Figure 3:
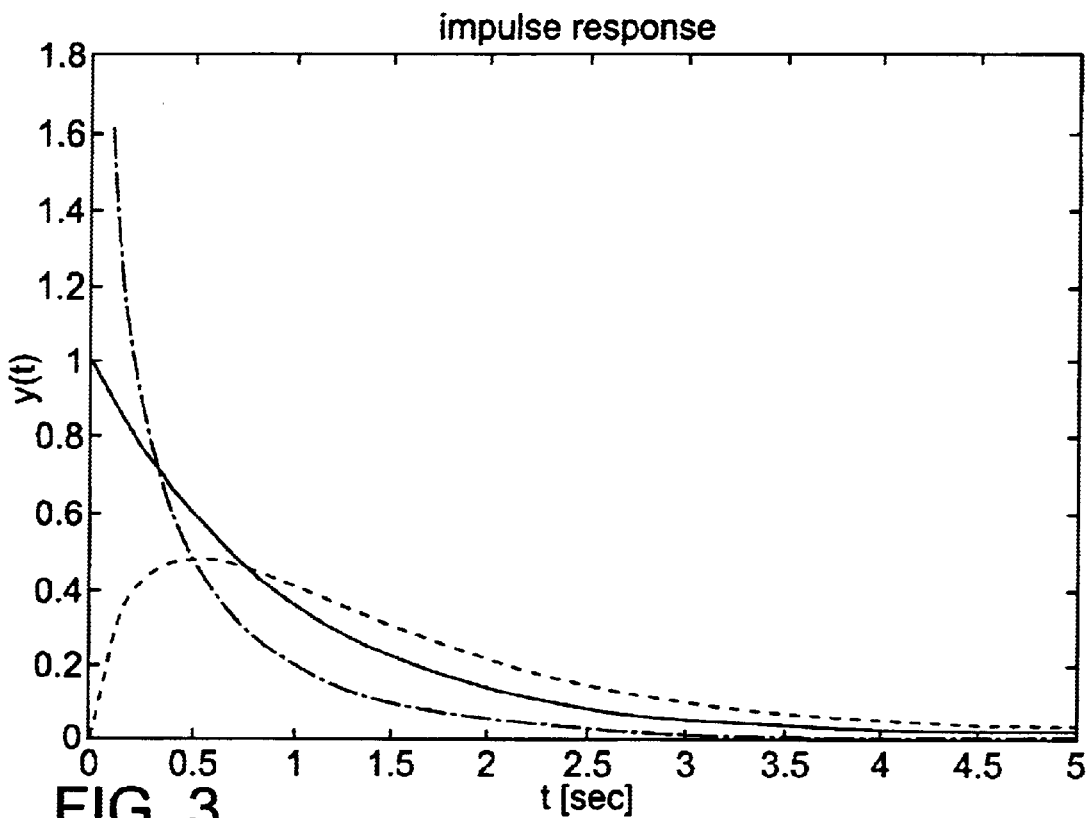
FIG. 3 shows the impulse response of a fractional system in accordance with the present invention.

The most relevant consideration regarding (14) is that, if m<1, for t→0 f(t) is infinite, as demonstrated by FIG. 3, which shows the impulse response of a fractional system for different values of m (dashed m=0.5, solid m=1, dotted=1.5).

However it can be shown that, for any positive m, f(t) satisfies the hypothesis of Cauchy's theorem on the existence of the integral, and therefore, the step response can be calculated. If we introduce the following definition of Incomplete Gamma Function $$\Gamma(m, x) = \int_0^x e^{-y} y^{m-1} dy \quad (15)$$

the step response of the fractional system in question can be expressed by the simple formula:

$$g(t) = \int_0^t f(t) dt = k \frac{\Gamma(m, pt)}{\Gamma(m)} \quad (16)$$

Figure 4:
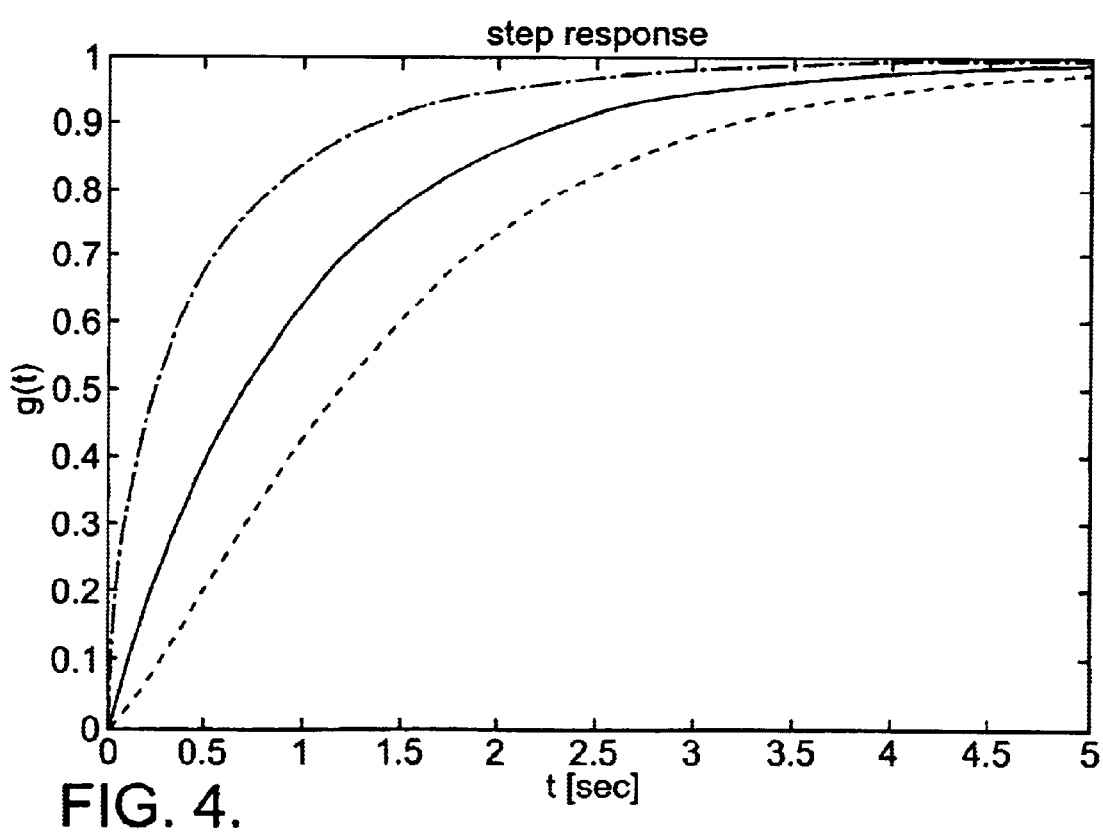
FIG. 4 shows the step response of a fractional system in accordance with the present invention.

In FIG. 4 the step response is shown of a fractional system for different values of m (dashed m=0.5, solid m=1, dotted=1.5). By looking at FIG. 4, a faster response of the system having m<1 can be observed. This fact, due to the infinite value of the derivative for t=0, may be successfully exploited for all those applications in which a high speed is required.

This may be the case of, e.g., applications in the areas of fast control schemes (see A. Outstaluop "Systèmes asservis lineaires d'ordre fractionnaire", Masson, Paris, 1983) or image processing (see, e.g., P. Arena, L. Bertucco, L. Fortuna, G. Nunnari, D. Porto "CNN with Non-Integer Order Cells", 5th IEEE International Workshop on Cellular Neural Networks (CNNA '98), London, Great Britain, April 1998, pp. 372–378.

During the nineteenth and twentieth centuries, the use of traditional differential calculus became the fundamental tool for describing any physical phenomena we can find in nature. Complex dynamics are usually modeled by a number N of first order differential equations. However, many complex physical phenomena exist whose analysis can be successfully performed via transfer functions of degree m, with m being a non-integer number.

As shown in several of the works cited in the introductory portion of this description, transmission lines, electrical noises, dielectric polarization and heat transfer phenomena are some of the fields involving non-integer order physical laws. In the time domain, these phenomena have been modeled using differential equations of infinite order, which are not so easy to handle. In the following, some examples of non-integer order systems and relative transfer functions, which may be found when studying this kind of physical phenomena, are reported. In all of them the role of non-integer order integration is quite evident.

Figure 5:
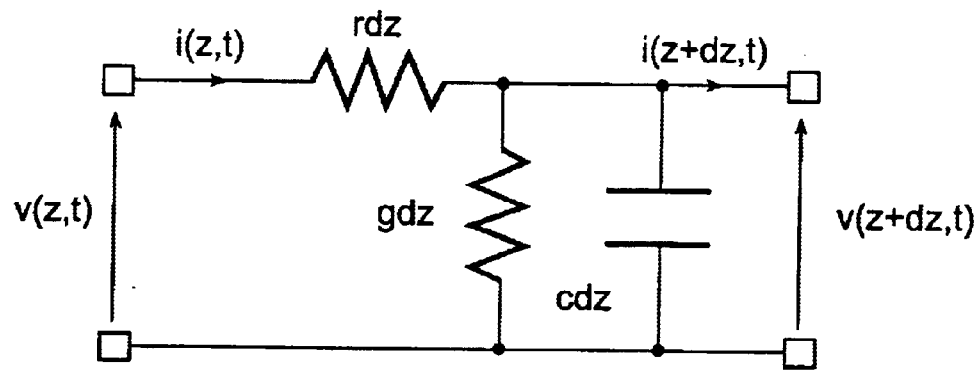
FIG. 5 shows a finite element of a non-inductive transmission line in accordance with the present invention.

A first example of a non-integer order system is transmission lines. Transmission lines are currently widely used in the fields of communications and power transmission. Because of their length, Kirchhoff laws cannot be adopted when studying them. In fact, it is well known that they are a particular case of Maxwell equations only if circuit dimensions are very small with respect to the minimum wavelength of the voltages (currents) flowing through them. However, if a transmission line is subdivided into a large number of elementary circuits of lengths dz, each of them can be considered a concentrated circuit as shown in FIG. 5.

There, a finite element of length dz in a non-inductive transmission line is shown. From Kirchhoff laws and for dz→0, the following partial differential equations can be derived:

$$\begin{cases} \frac{\partial v}{\partial z} = -ri \\ \frac{\partial i}{\partial z} = -gv - c\frac{\partial v}{\partial t} \end{cases} \quad (17)$$

These equations are easily solvable by using a Laplace transform, which reduces the problem to an ordinary differential equation. In fact, it can be demonstrated that the solutions, in the s-domain, are the following:

$$V(s, z) = \left[\frac{V(s,0)}{2} + \frac{I(s,0)}{2}\sqrt{\frac{r}{g+sc}}\right] e^{-\sqrt{r(g+sc)}\,z} + \left[\frac{V(s,0)}{2} + \frac{I(s,0)}{2}\sqrt{\frac{r}{g+sc}}\right] e^{\sqrt{r(g+sc)}\,z} \quad (18)$$

-continued $$I(s, z) = \left[\frac{I(s, 0)}{2} + \frac{V(s, 0)}{2}\sqrt{\frac{g+sc}{r}}\right]e^{-\sqrt{r(g+sc)}\,z} +$$

$$\left[\frac{I(s, 0)}{2} + \frac{V(s, 0)}{2}\sqrt{\frac{g+sc}{r}}\right]e^{\sqrt{r(g+sc)}\,z}$$

The positive exponential (reflection wave term) disappears in both solutions if the input impedance of the line is the following:

$$\frac{V(s, 0)}{I(s, 0)} = \frac{\sqrt{r}}{\sqrt{g+sc}} \quad (19)$$

This result, which holds even for all z (characteristic impedance of a non-inductive transmission line), shows a voltage-current relation expressed by a fractional order transfer function with one pole belonging to the generic kind $$F(s) = \frac{k}{\left(\frac{s}{p}+1\right)^m} \quad (20)$$

where $k=(r/g)^{0.5}$, $m=0.5$, $p=g/c$.

A second example of a non-integer order system is with respect to the polarizaiton phenomena. Since dielectric mediums can be modeled as distributed parameter systems, their behavior can be analyzed in a way similar to what has been done for transmission lines. Except for metal electrodes, it can be shown that for certain kinds of noble materials (e.g., gold, silver, and platinum), the frequency polarization impedance response follows a more complex fractional order law.

Expression (20) is not adapted to describe this phenomenon and for that reason it has to be replaced by its more general form:

$$F(s) = \frac{k}{\prod_{i=1}^{n}\left(\frac{s}{p_i}+1\right)^{m_i}} \quad (21)$$

where n is the number of poles of the multiple-pole transfer function. Experimental results seem to suggest a small value for n, which leads to a more comfortable approximation if we use a frequency domain method. As an example, a platinum electrode, when the sinusoidal input amplitude is 65 mV, is described by the following three-pole transfer function:

$$H(s) = \frac{1}{(1+10000s)^{0.11}(1+210s)^{0.36}(1+0.124s)^{0.35}} \quad (22)$$

Obviously, (22) can be considered as a cascade of three single poles fractional order systems and each of them may be studied separately in the frequency domain.

Numerical differintegration will now be discussed. As explained previously, the integral of definition (1) reproduced in the foregoing is not always solvable in a closed form. For this reason, a numerical approximation is needed to allow an automatic evaluation of it. Obviously, the first step starts from (1), which is rewritten as follows:

$$\frac{d^{-q}f(t)}{dt^{-q}} = \frac{1}{\Gamma(q)}\int_0^t (t-\tau)^{q-1}f(\tau)d\tau$$

Let us divide the interval [0, t] into k subintervals, with k+1 being the number of samples of f(t) which are indicated for simplicity, in the following way:

$$f_0 \equiv f(0) \quad (23)$$

$$f_1 \equiv f\left(\frac{t}{k}\right)$$

$$\cdots$$

$$f_j \equiv f\left(\frac{jt}{k}\right)$$

$$\cdots$$

$$f_k \equiv f(t)$$

The integral extended to the whole interval [0, t] may be divided into the sum of k integrals:

$$\frac{d^{-q}f(t)}{dt^{-q}} = \frac{1}{\Gamma(q)}\sum_{j=0}^{k-1}\int_{jt/k}^{(j+1)t/k}(t-\tau)^{q-1}f(\tau)d\tau \quad (24)$$

Assuming f to be constant inside each subinterval (for example, equal to the mean value of the two extreme samples), its value can be extracted from the integral $$\int_{jt/k}^{(j+1)t/k}(t-\tau)^{q-1}f(\tau)d\tau \approx \quad (25)$$

$$\frac{f\left(\frac{jt}{k}\right)+f\left(\frac{(j+1)t}{k}\right)}{2}\int_{jt/k}^{(j+1)t/k}(t-\tau)^{q-1}d\tau =$$

$$\frac{f_j+f_{j+1}}{2q}\left\{\left[t-\frac{jt}{k}\right]^q - \left[t-\frac{(j+1)t}{k}\right]^q\right\}$$

Finally, the following formula is obtained (see also the work by Oldham and Spanier already cited in the foregoing):

$$\frac{d^{-q}f_k}{dt^{-q}} = \frac{T^q}{\Gamma(q+1)}\sum_{j=0}^{k-1}\frac{f_j+f_{j+1}}{2}[(k-j)^q - (k-j-1)^q] \quad (26)$$

where T is the sample time t/k, whose choice becomes relevant if q>1. It must be noted that the calculation of every value requires the availability of all the preceding samples (i.e., a theoretically infinite memory). This fact may lead to a long computation time when a lot of steps are necessary.

A non-integer order $PI^\lambda D^\mu$ controller versus the classical PID controller will now be discussed. A control of dynamic chaos has been obtained in a number of vastly different physical systems including electronic circuits, lasers, physiological heartbeats and chemical systems. The elimination of unstable behavior in such system is generally advantageous, as the system under study is transformed from a state of unpredictability into one of absolute regularity.

Figure 6:
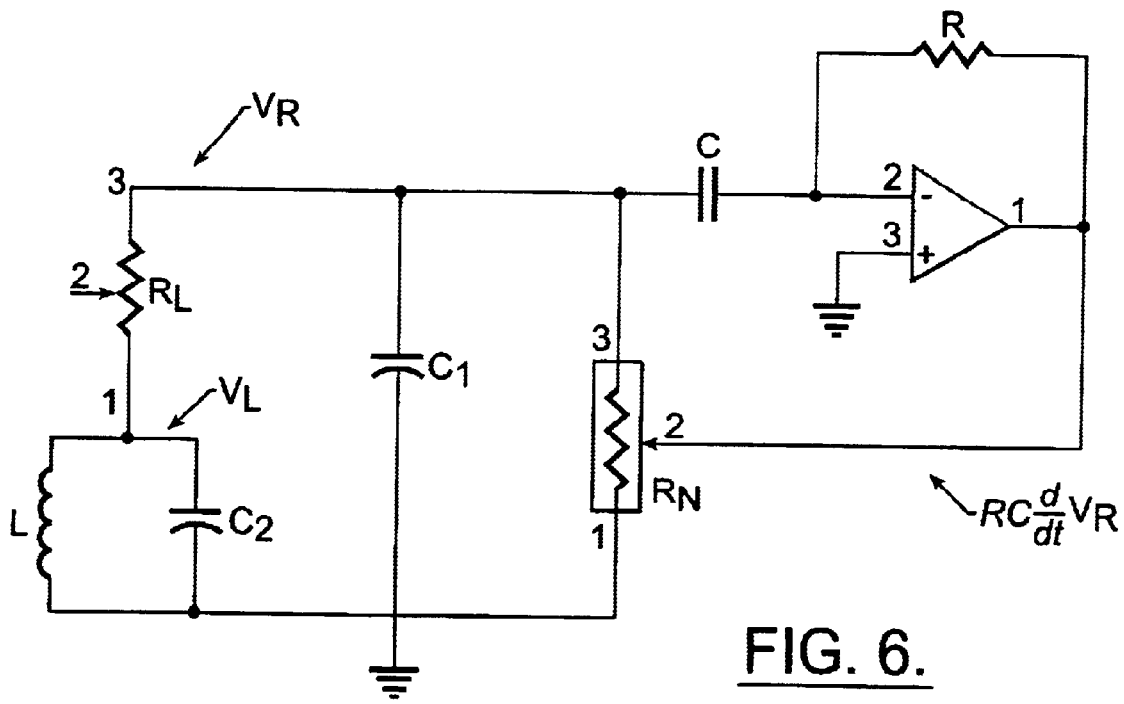
FIG. 6 shows the circuit usually indicated as Chua's circuit in accordance with the present invention.

In FIG. 6, the so-called Chua circuit is shown, providing for the presence of a chaotic variable $V_R$ and a differentiating circuit. The feedback signal, which is proportional to the time derivative of $V_R$, continuously modulates the negative resistance value of the Chua diode $R_N$.

Figure 7:
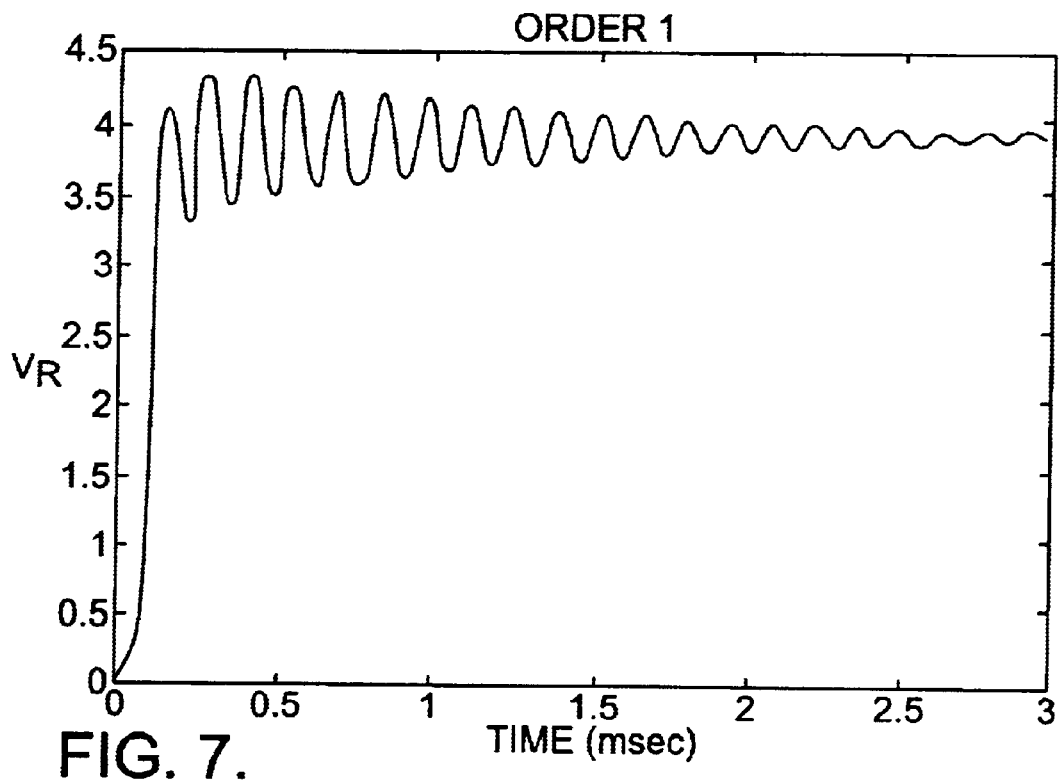
FIGS. 7 and 8 show respective plots of a chaotic variable in Chua's circuit with respect to FIG. 6.

In order to control the Chua circuit, a continuous feedback, proportional to the derivative of the chaotic signal, can be used. Using the first order derivative, the plot of chaotic variable $V_R$ of the Chua circuit is as shown in FIG. 7, where the trend of the variable $V_R$ in the Chua circuit with PD controller is shown.

Figure 8:
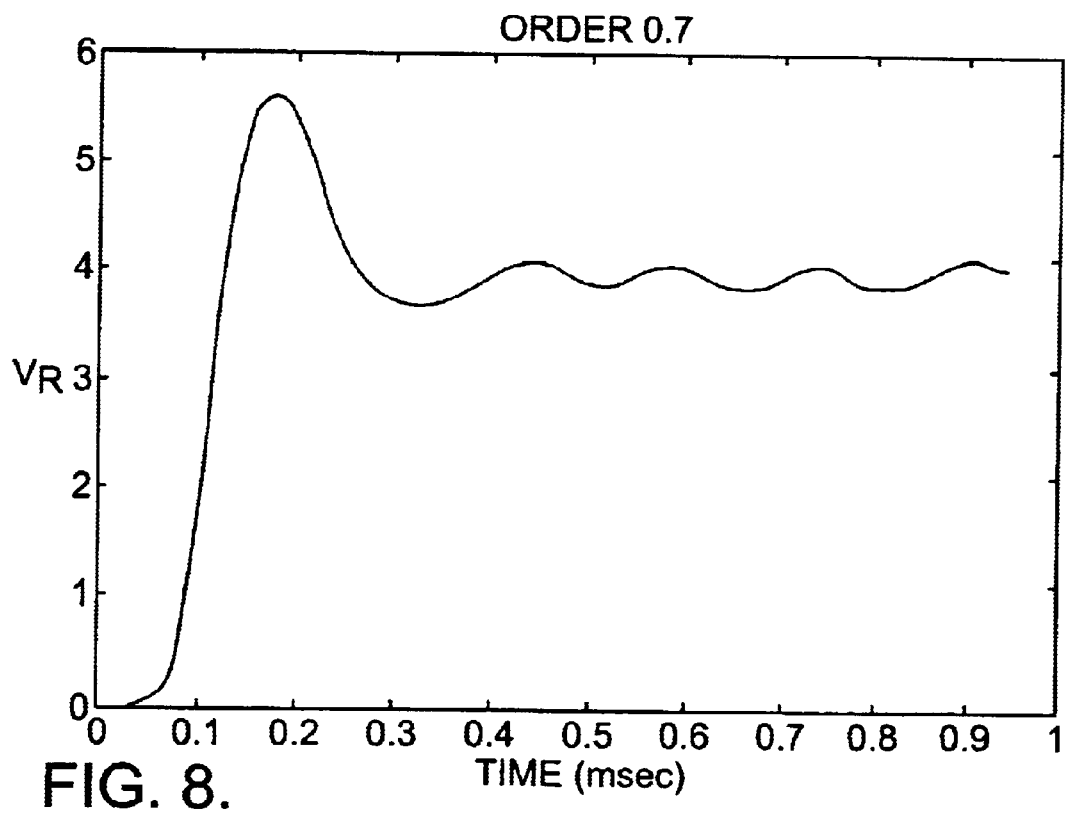

Conversely, in FIG. 8 the plot of chaotic variable $V_R$ is depicted when a derivative of order 0.7 is used. From the comparison of the two pictures, it is possible to observe that when the non-integer order PD controller has been used, there is a faster response and smaller oscillation with respect to the classical PD controller.

A preferred embodiment of the present invention will now be discussed. As outlined previously prior art approaches for non-integer order circuit realization are not always very exact, due to frequency limitations and approximations error. In particular, analog design implies the realization of time varying capacitors that are usually difficult to modulate according to desired trends (see, e.g., the work edited by B. Ross already cited in the foregoing) and digital circuitry needs a large memory area to store function samples.

Conversely a neural network modeling may insure, at the same time, a good degree of approximation and the possibility, by keeping a fixed structure, of changing the integration order by a well-defined configuration of weights. Also, a hardware realization of the obtained networks can be easily designed.

As explained, e.g., in the work by Keshner referred to in the foregoing, the more integer order poles used for obtaining the desired approximation, the more accurate the approximation results. For that reason a multi-layer perceptron is chosen with a sufficiently large number of inputs in order to simulate a high order system.

The integrator according to formula (1) is adapted to be modeled by the following NARMAX equation:

$$y(k)=F[y(k-1), \ldots, y(k-19), u(k-1), \ldots, u(k-19)] \quad (27)$$

This equation can be implemented by a neural network and, as predicted in the theory of black box identification, the network in question must have 38 inputs and 1 output.

Figure 9:
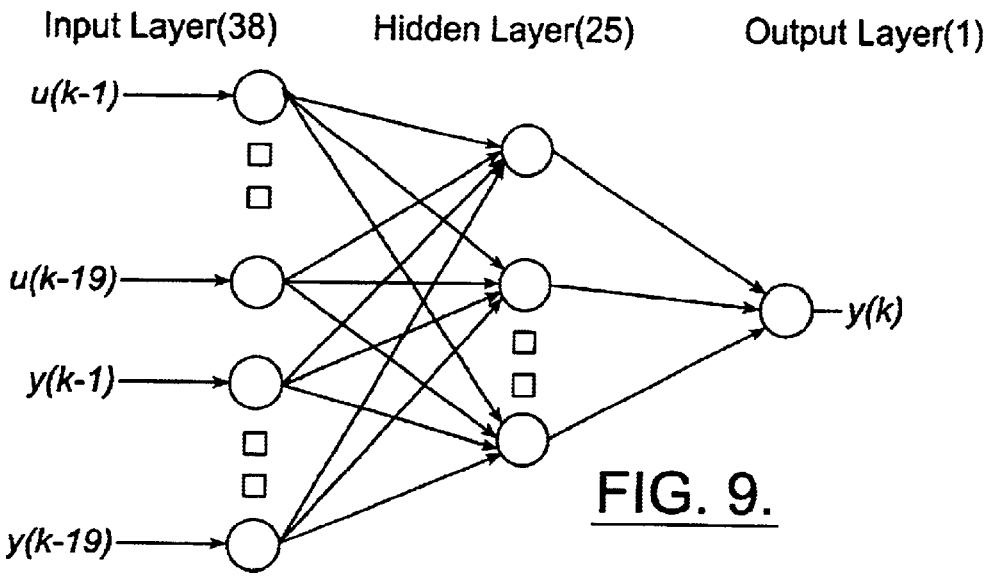
FIG. 9 shows a multi-layer perceptron adapted for simulating a m-order integrator in accordance with the present invention.

The number of neurons in the hidden layer can be set initially to 20 and then moved to 25 so the total number of weights is 950. An example structure for the network is reported in FIG. 9, which shows the multi-layer perceptron adopted for the simulation of the m-order integrator (38-25-1).

Figure 10:
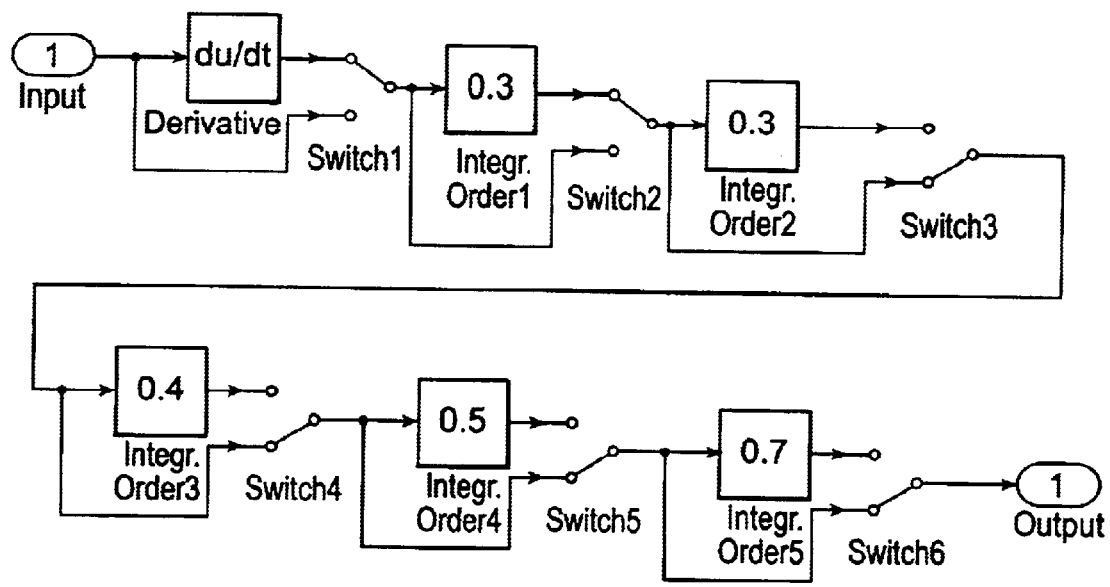
FIG. 10 shows a switch configuration for a non-integer order derivative in accordance with the present invention.

The type of integrator to be formed will now be considered. Due to expected applications in the field of control, we focus our attention on orders 0.3, 0.4, 0.5, 0.7. Furthermore, it must be noted that with a suitable combination of them, it is possible to obtain a universal integro-differentiator whose order can be changed in the range of [−1,1] by steps of 0.1. This is shown in FIG. 10 with specific reference to a switch configuration for a derivative of order 0.7.

Figure 11:
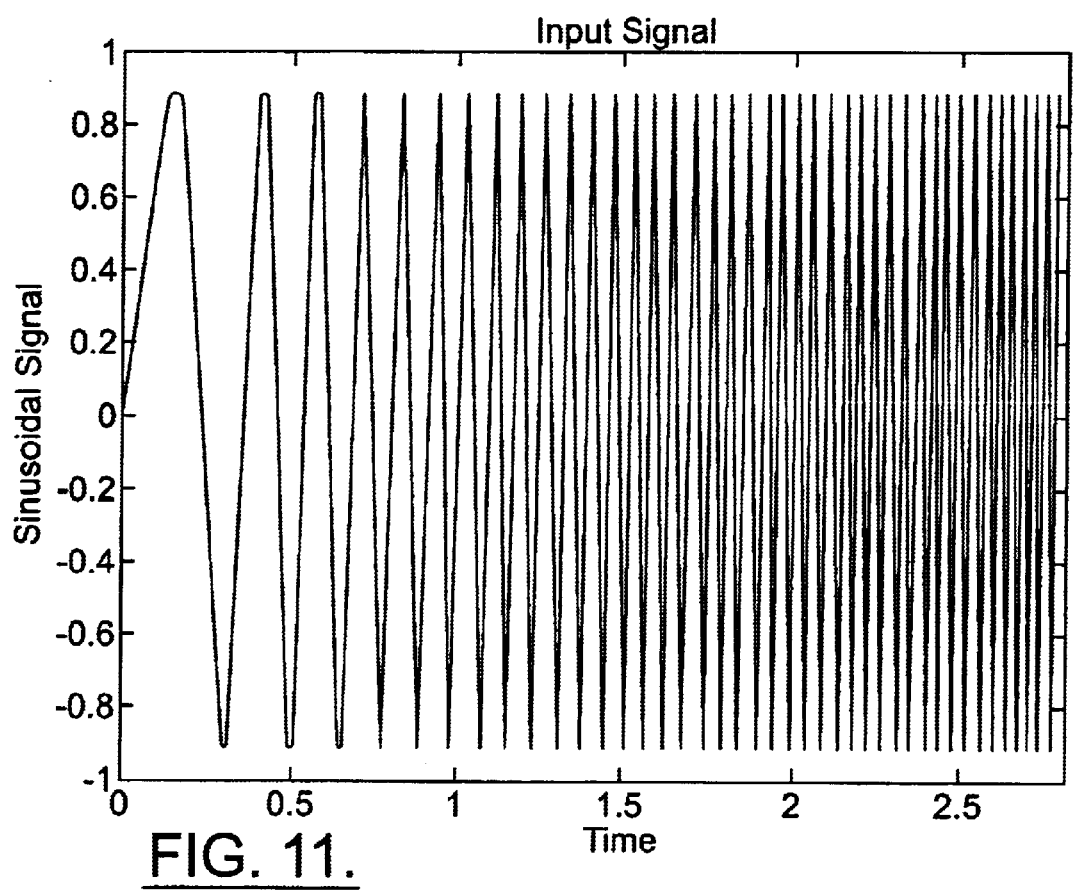
FIG. 11 shows a respective signal for the learning phase with respect to FIG. 10.
Figure 12A:
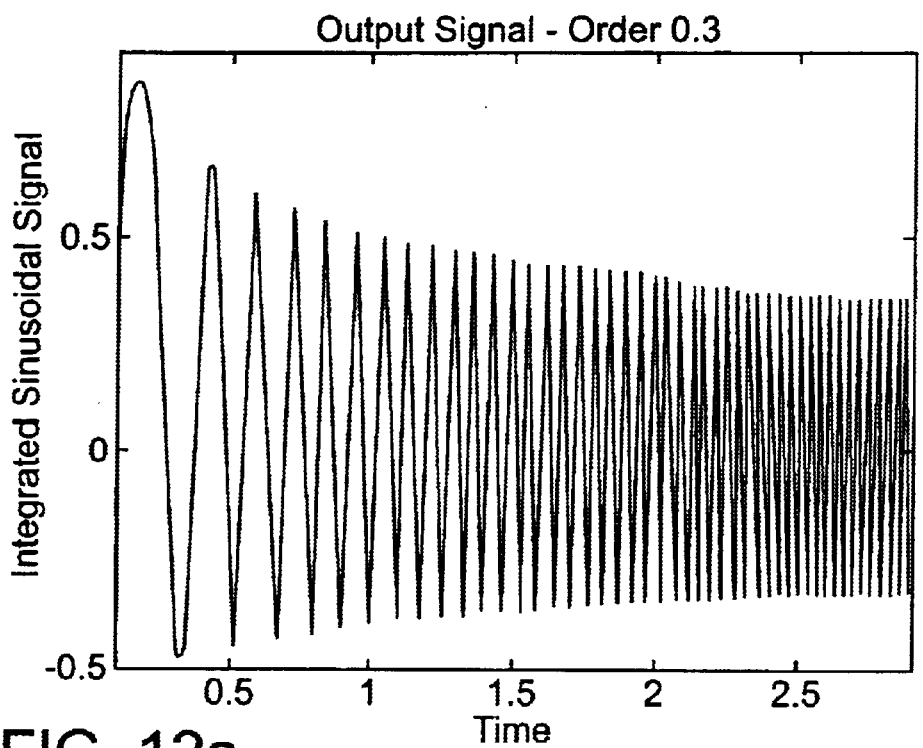
FIGS. 12a, 12b, 12c and 12d respectively show various output signals used in the training of various neural networks implementing a non-integer order integro-differentiator in accordance with the present invention.
Figure 12B:
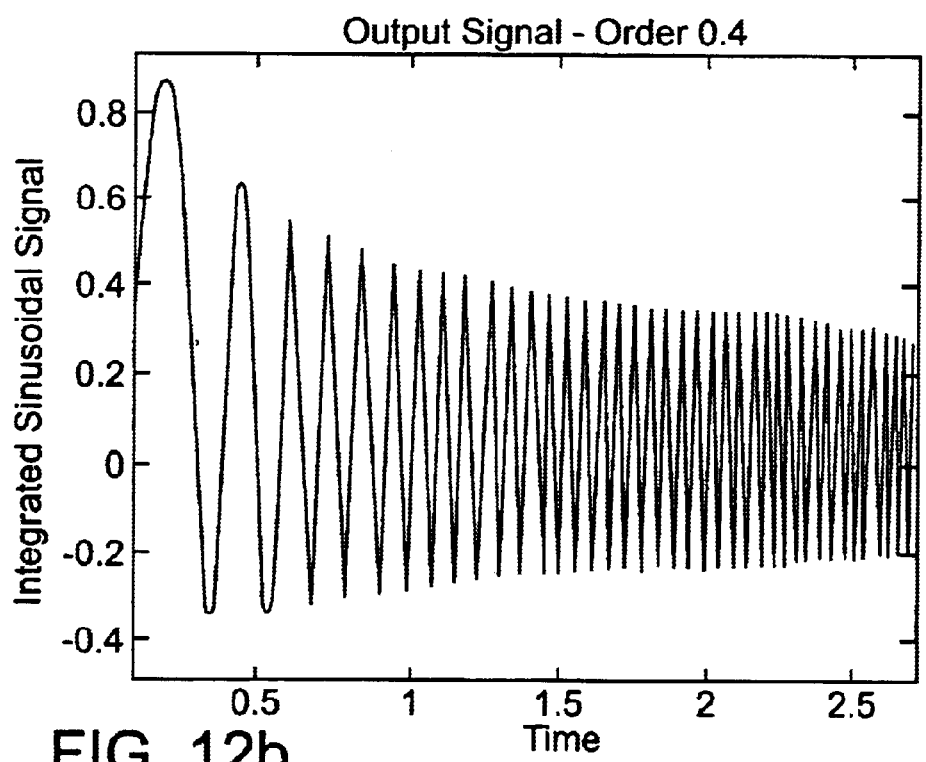
Figure 12C:
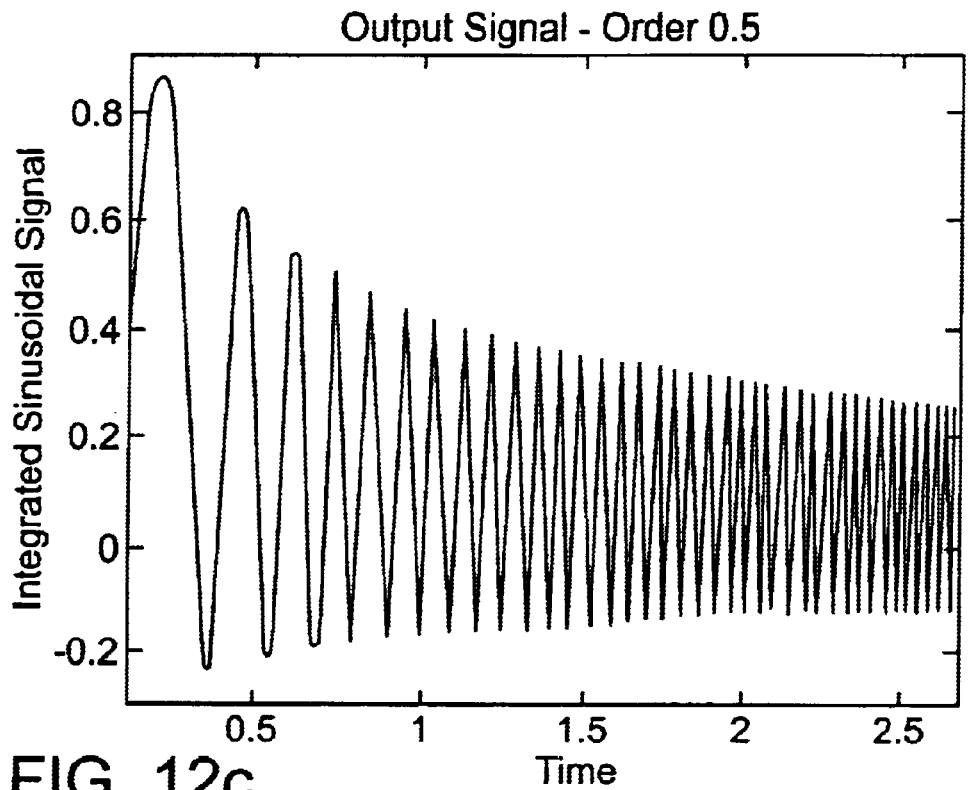
Figure 12D:
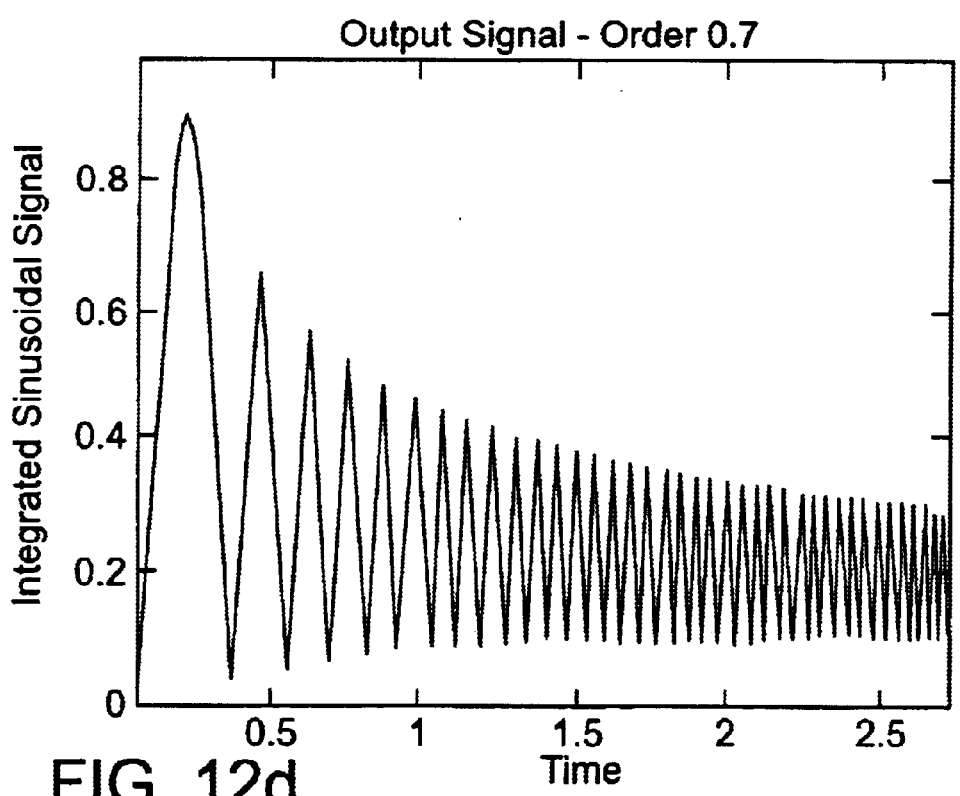

To this aim, four different neural networks are trained with a chirp signal containing frequencies from 1 to 100 Hz (see FIG. 11) and with their m-order integrals. See FIGS. 12a–12d, where the output signals used in the training of the four networks are shown in the four sections designated a) to b), respectively. Nineteen samples are fed back at each step. The number of learning patterns used for the training phase has been fixed to 10,000.

The neural networks thus obtained are then tested with a square wave signal at the frequency of 10 Hz. This choice has been made since a square wave is a signal with a good number of harmonics. It can be represented by the following equation:

$$u(t) = \begin{cases} 0.9 & n/10 < t < (n+1)/10 \ n \text{ even} \\ -0.9 & n/10 < t < (n+1)/10 \ n \text{ odd} \end{cases} \quad (28)$$

The frequencies contained in the signal are the odd ones (10, 30, 50, 70 Hz) and have appreciable amplitude until 190 Hz.

Figure 13:
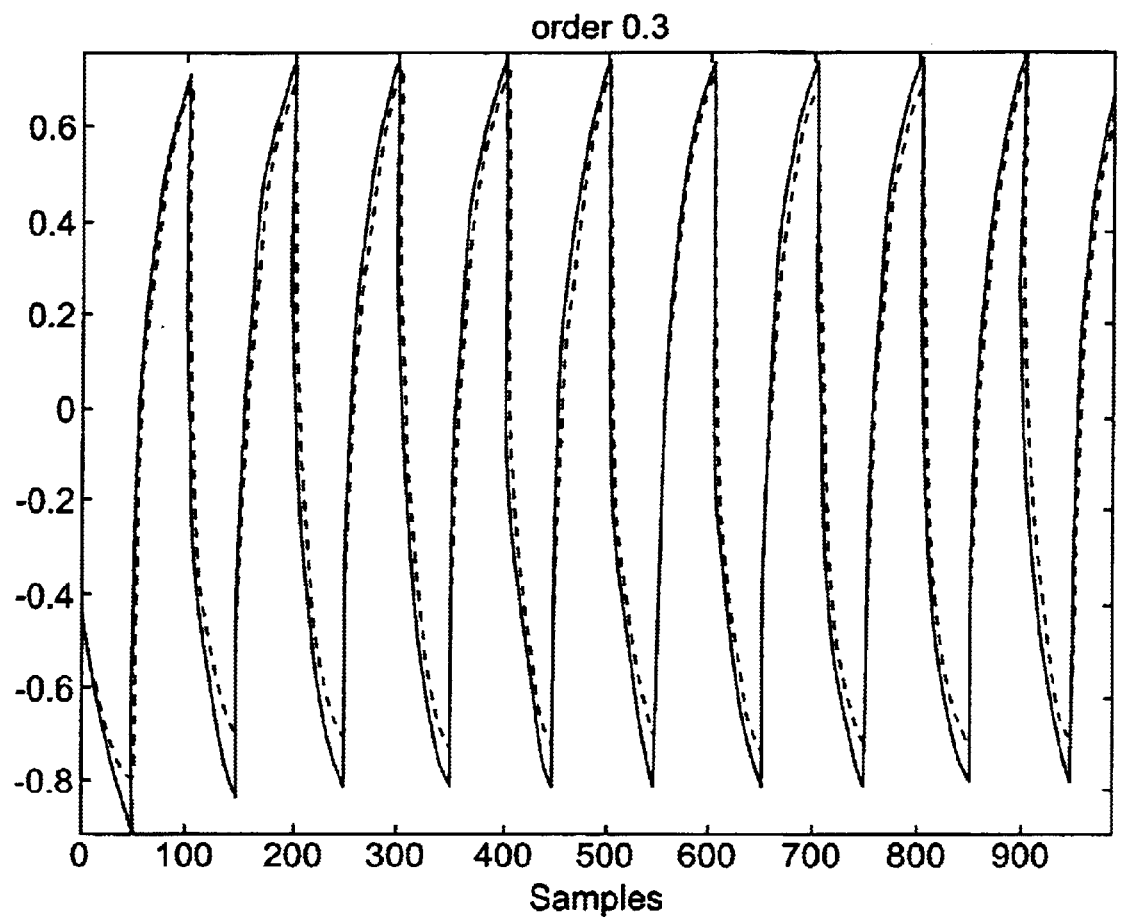
FIG. 13 shows the results of order 0.3 integration of a square wave with respect to FIG. 10.

The assumption that the networks have been trained with a signal having 100 Hz, as the maximum frequency does not affect the final results. In fact, every network seems to fit quite well the expected results, and therefore, it can be concluded that they perform exactly the desired integration. Specifically, FIG. 13 shows the results of order 0.3 integration of a square wave. The output of the network (dashed) is very close to the real one (solid).

Figure 14:
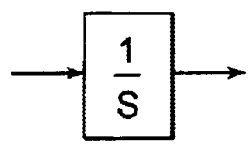
FIGS. 14 and 15 show, by way of comparison, the representation of a classical integrator and the block scheme of a non-integer order integrator in accordance with the present invention.
Figure 15:
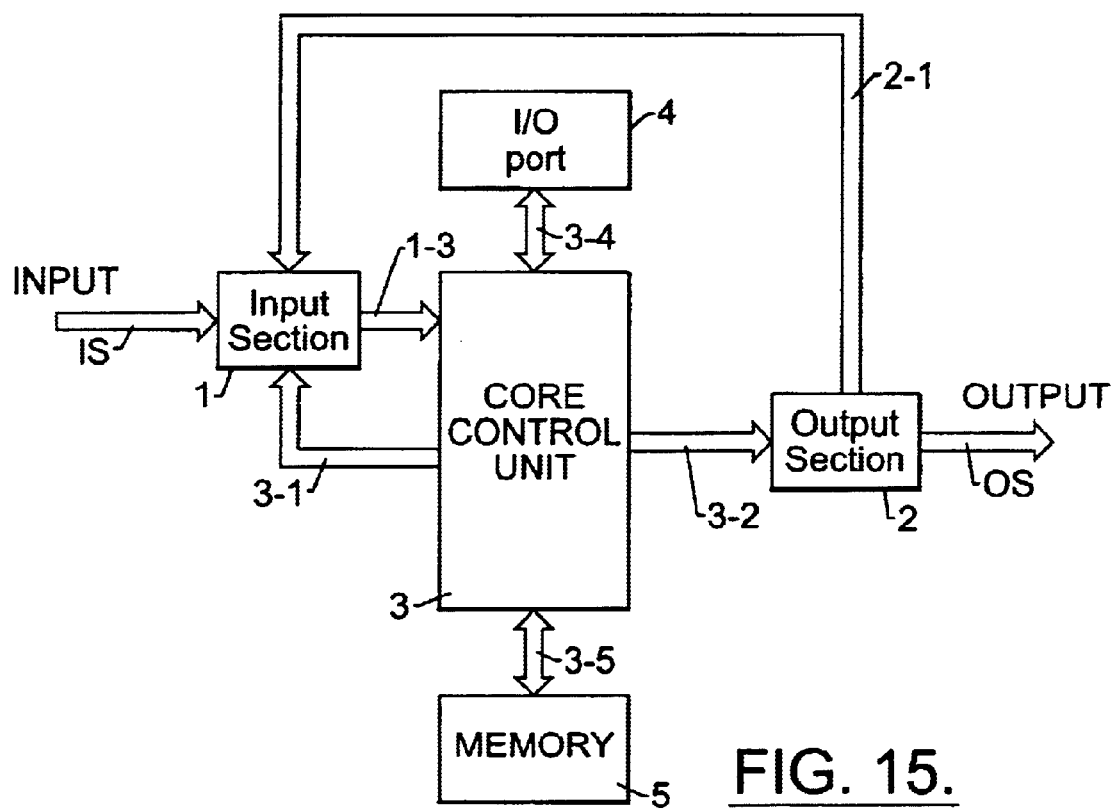

Turning now specifically to the hardware of a non-integer order integrator, a representation of a classical integrator block is given in FIG. 14, while the proposed block scheme of the non-integer controller integrator is given in FIG. 15. There, references 1 and 2 designate input and output sections of a neural network adapted to receive an input signal IS and to deliver an output signal OS, respectively.

Reference 3 designates the core of the network, while references 4 and 5 designate input/output and memory blocks, respectively. Arrows 1-3, 2-1, 3-1, 3-2, 3-4 and 3-5 show the flow of data between the various blocks considered in the foregoing.

Figure 16:
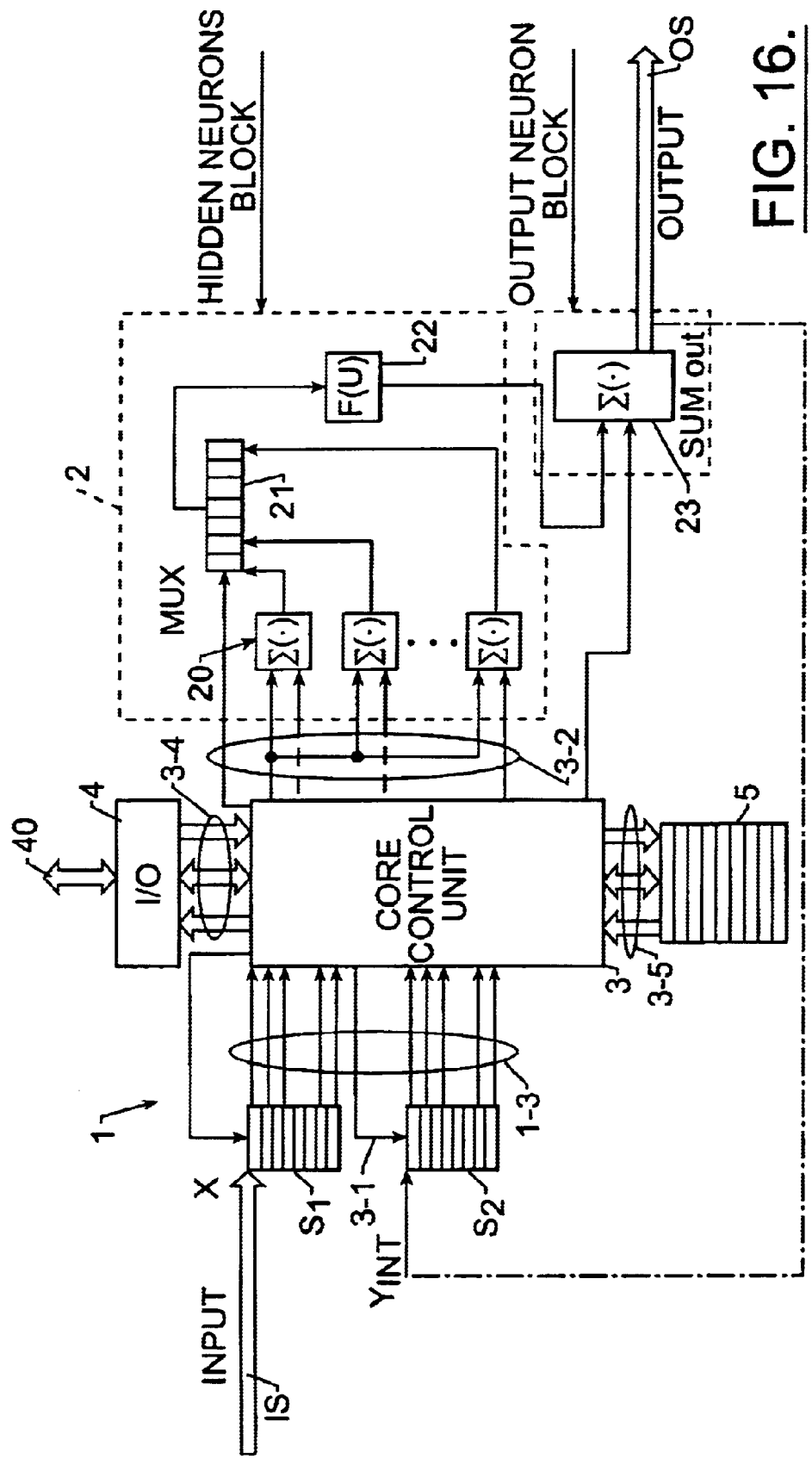
FIG. 16 shows one possible implementation of the blocks shown in FIG. 15.

One possible implementation of the blocks reported in FIG. 15 is given in FIG. 16. The weights $w_j$ and the bias values $b_i$ (i.e., the coefficients) of the neural network, previously determined by using the back propagation algorithm, are acquired through an I/O port 4 and then stored into the memory block 5.

The input signal IS (X) is acquired and loaded into a shift register ($S_1$) controlled by the core 3. The core 3 control unit manages also the shift register $S_2$, utilized for the feedback of the output. For each input stored in the shift registers $S_1$ and $S_2$, the core reads the appropriate weights, and moves it in blocks $\Sigma(\cdot)_i$ (designated 20) that calculate the input for the each neuron, according to the formula: $\Sigma(w_j \ x_i)+b_i$.

Using a multiplexer 21, it is possible to calculate the output for every neuron using only one sigmoidal function F(u) (block 22). Another $\Sigma(\cdot)$ block (designated 23) forms the output layer that received the input from the previous layer and the weights and bias from the core. This block calculates the neural network output OS.

Figure 17:
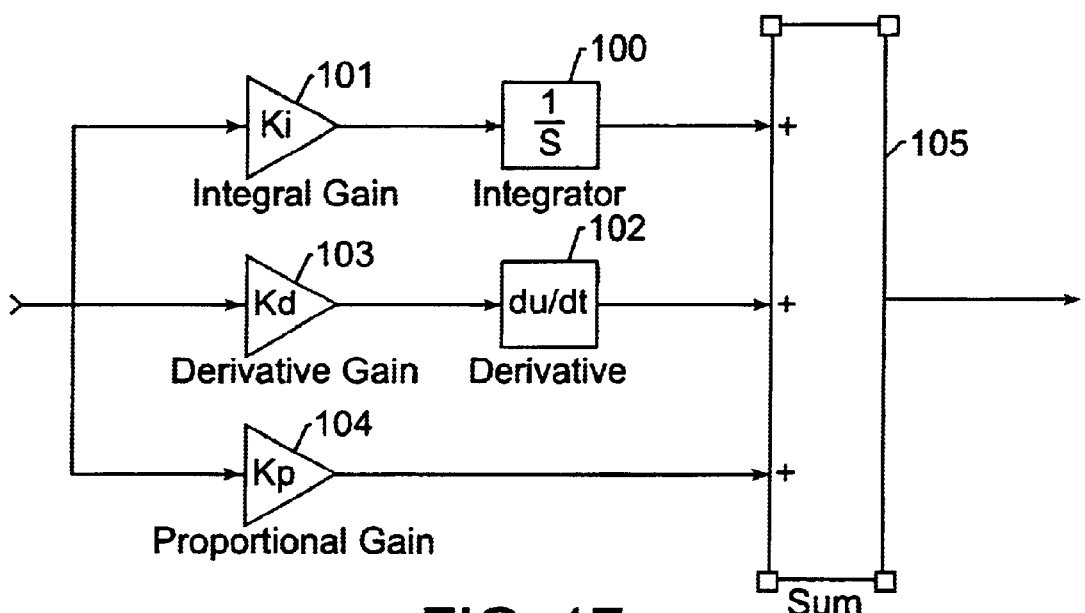
FIG. 17 shows a block scheme of a PID controller in accordance with the present invention.

An interesting application of a non-integer order integrator is a non-integer order $PI^\lambda D^\mu$ controller. A proportional, integral, and differential (PID) controller comprises (as shown in FIG. 17) three main blocks: an integrator 100 plus an (integral) gain 101, a derivator 102 with a corresponding (derivative) gain 103 and one proportional block 104. By properly setting the respective gains these blocks act on the input signal providing the output control variable which is obtained by an adder 105 summing the results of integration, differentiation and proportional gain.

Figure 18:
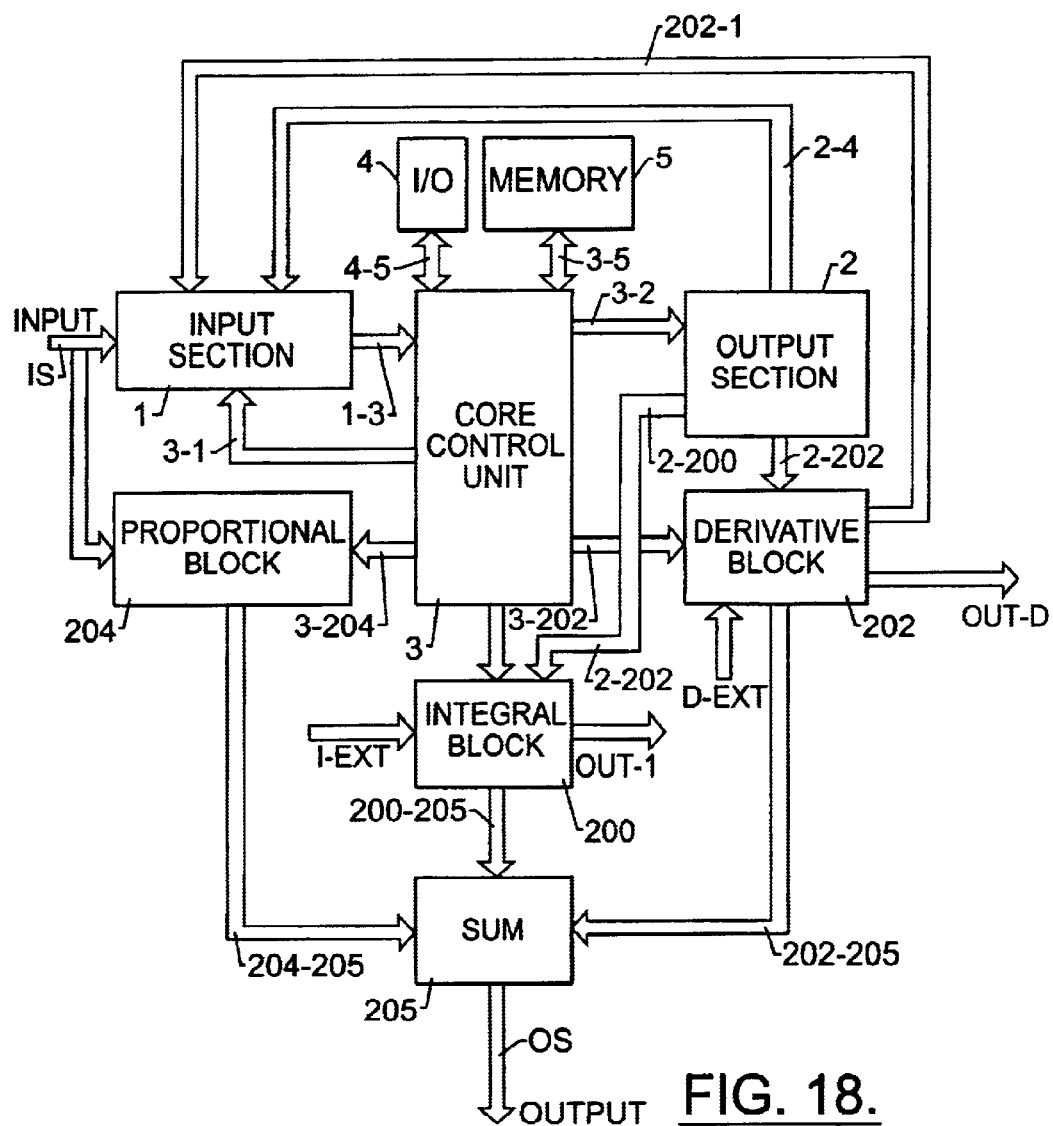
FIGS. 18 and 19 show the possible implementation of a non-integer order $PI^\lambda D^\mu$ controller in accordance with the present invention.
Figure 19:
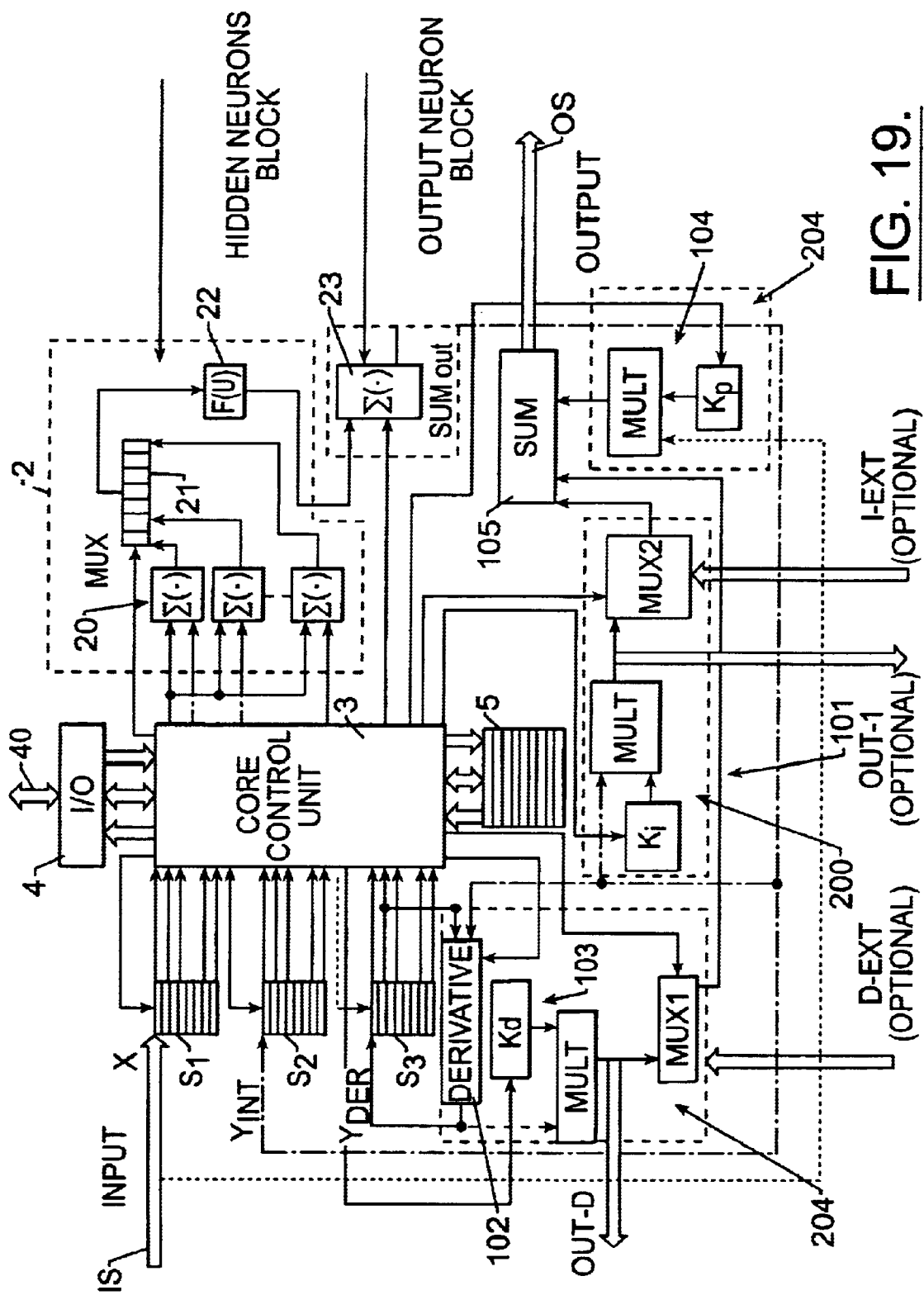

The proposed block scheme of the neural non-integer order PID is given in FIG. 18 while one possible implementation of the blocks reported in FIG. 18 is given in FIG. 19. In these figures the same references already used in FIGS. 15 and 16 were used to designate parts or elements identical or equivalent to those already described.

Also, references 200, 202, 204 and 205 designate blocks which apply to the signals fed thereto respective integral (200), derivative (202) and proportional (204) processing. An adder generating the main output signal OS is designated 205. Transfer of data takes place along lines designated, as in the foregoing, by the references of the respective interconnected blocks separated by a hyphen.

In particular, the derivative block 202 is obtained from the integrator one 200. In fact, the non-integer order derivative is the integer order derivative of an opportune non-integer order integral (see equation (4)). In this way, it is possible to form a device that can compute both the integral and derivative, while also providing intermediate (optional) inputs/outputs as shown by D-EXT, I-EXT, OUT-D or OUT-I.

The possible relevance of such intermediate inputs/outputs will be better appreciated in the following with respect to the possible connection of several $PI^\lambda D^\mu$ controllers. The weights and the bias of the neural network, previously determined by using the back propagation algorithm are acquired through the I/O port 40 and then stored into the memory block 5.

As in the foregoing, the input signal IS (X) is acquired and loaded into a shift register $S_1$ controlled by the core. The core control unit manages also the shift registers $S_2$ and $S_3$ utilized for the feedback of the integrator and derivative outputs. For each input stored in the shift register $S_1$–$S_3$, the core 3 reads the appropriate weights and moves it in the blocks $\Sigma(\cdot)_i$ 20 that calculate the input for the each neuron, according to the formula: $(w_j\ x_i)+b_i$.

Using multiplexer 21, it is possible to calculate the output for every neuron using single Sigmoidal Function F(u) (block 22). The $\Sigma(\cdot)$ block 23 ($SUM_{out}$) forms the output layer that received the input from the previous layer and the weights and bias from the core. This block calculates the neural network output. The output of the block 23 is sent alternatively to the S2 shift register or to the derivative block 204. The core 3 manages this switching.

Due to the fact that only one block is used to perform both the non-integer order derivative and the non-integer order integral, the core unit 3 has to load from the memory block once the data to compute the former and once the data for the latter, processing always the same input. The sum of input, its derivative and its integral, multiplied respectively by the gains $K_p$, $K_d$ and $K_i$ (implemented by respective multiplexers designated 104, 103 and 101 for consistency with FIG. 17), gives the system output.

Two multiplexers are additionally provided, which are designated MUX1 and MUX2. By using MUX1, managed via the core, it is possible to receive, and then manage, a derivative term D-EXT computed outside, for example, a simple derivative term computed by an analogous device. In the same way by using MUX2 it is possible to manage an external integrative term I-EXT. So by using MUX1 and MUX2 signal it is possible to manage a modular architecture based on the proposed $PI^\lambda D^\mu$ system.

Figure 20:
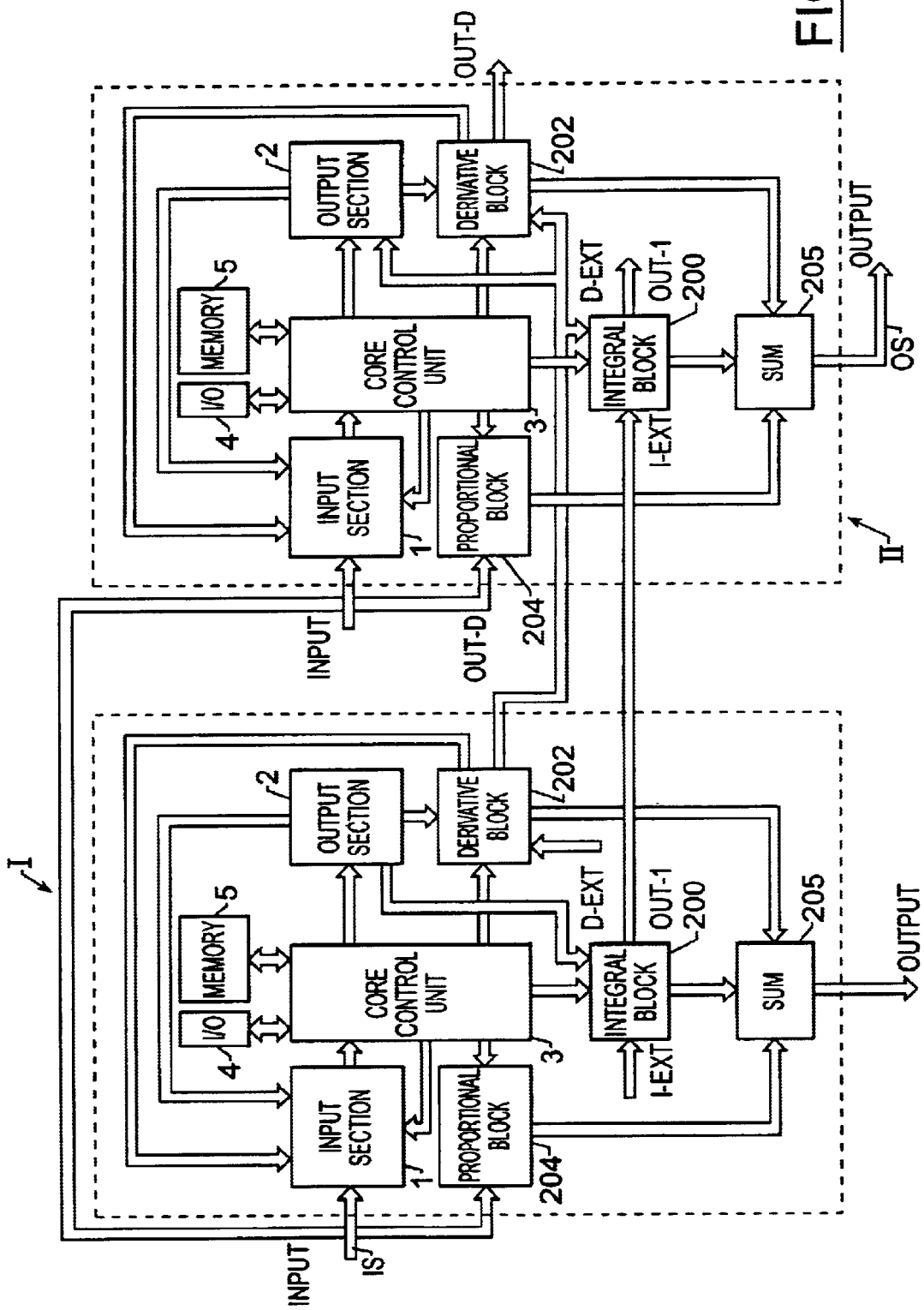
FIG. 20 shows the connection scheme of two non-integer order $PI^\lambda D^\mu$ controllers in accordance with the present invention.

The connection scheme of two non-integer $PI^\lambda D^\mu$ controllers I and II is given in FIG. 20, where the same reference numerals are reproduced which were already used in FIG. 18. Finally, an example of implementation of the neuron blocks contained in a non-integer order $PI^\lambda D^\mu$ controller will be given. Let us consider, any of the blocks $\Sigma(\cdot)_i$ and $\Sigma(\cdot)$ designated 20 and 22 in FIG. 19. They implement the following relationship:

$$U_j = \sum_{i=1}^{N} W_i * X_i + b_j \quad (29)$$

Figure 21:
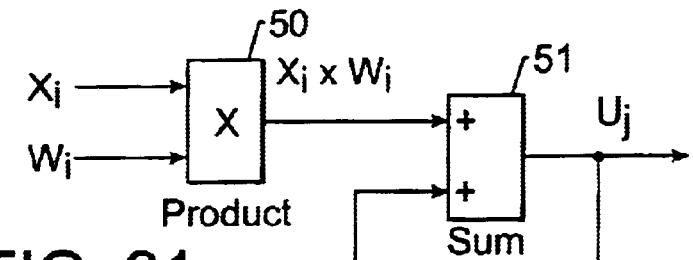
FIGS. 21 and 22 show two possible implementations of some of the blocks shown in the previous figures.
Figure 22:
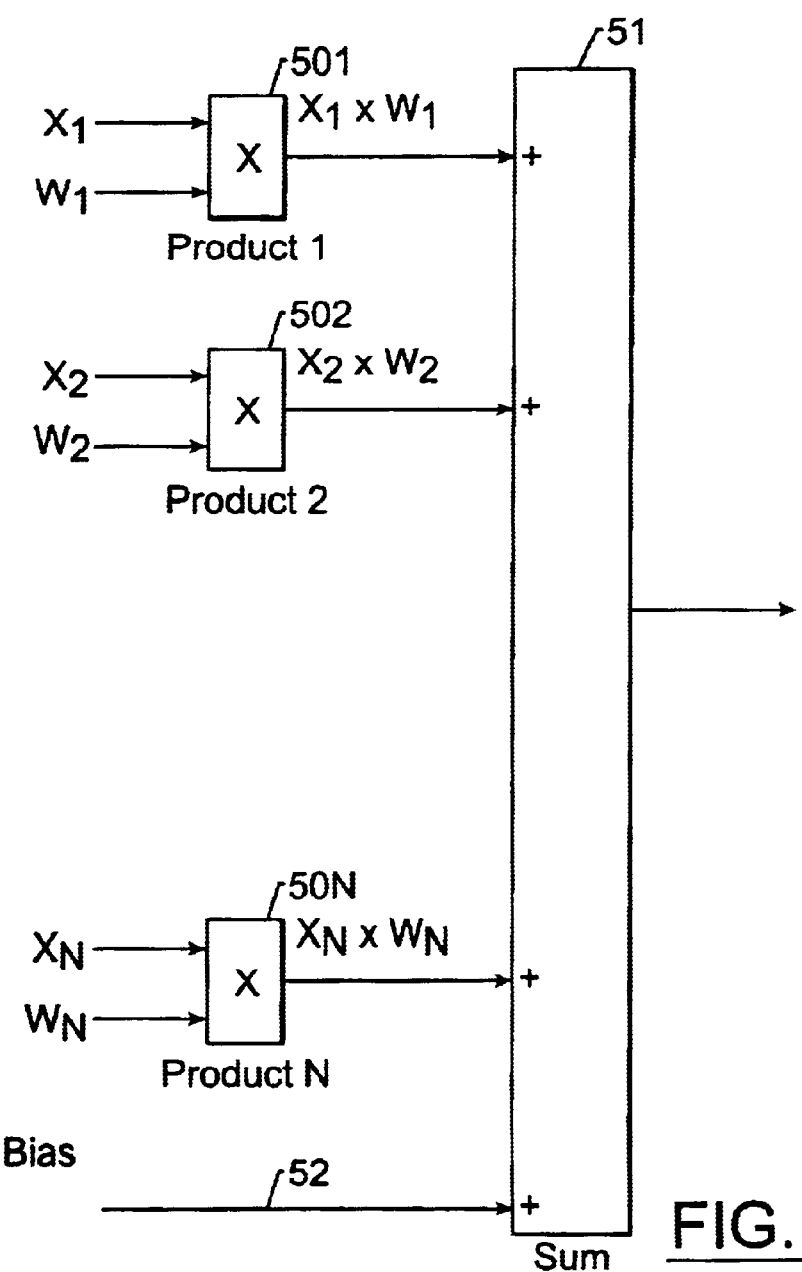

A possible way of implementing the captioned sum (in fact, a linear combination) is described by the block schemes of FIGS. 21 and 22. Specifically, the implementation of FIG. 21 provides for the presence of a product block 50 followed by a recursive adder block 51.

The advantage of this implementation is the small area requirement. In fact, in this case it is necessary only one sum block and one multiplier. The disadvantage is due to the large number of iterations and therefore, to the large number of clock cycles. Another possible implementation is the one shown in FIG. 22 providing for the presence of a plurality of multiplier blocks 501, . . . , 50N whose outputs are fed to a single non-recursive adder block 51. The output sum value of adder 51 is controlled by a bias line 52.

Advantages and disadvantages of this structure are dual with respect to the previous one. In fact, the sum is performed within few clock cycles because the operations are executed in parallel. However, this fact implies a larger area occupation. Of course, the basic principles of the invention remaining the same, the details of implementation and the embodiments may vary, without thereby departing from the scope of the invention as defined in the annexed claims.

That which is claimed is:

1. A circuit for implementing a non-integer order dynamic system, the circuit comprising:
   a neural network for receiving at least one input signal and for generating therefrom at least one output signal, the at least one input and output signals being related to each other by a non-integer order integro-differential relationship through coefficients of said neural network.

2. A circuit according to claim 1, further comprising a memory for storing the coefficients of said neural network.

3. A circuit according to claim 1, wherein the coefficients of said neural network are determined by a back propagation algorithm.

4. A circuit according to claim 1, further comprising an input port for receiving the coefficients of said neural network.

5. A circuit according to claim 1, further comprising:
   at least one input layer register for receiving the input signal; and
   at least one neuron comprising at least one adder block for calculating an input thereof based on the at least one input signal and a respective set of coefficients.

6. A circuit according to claim 5, wherein said at least one neuron comprises at least one weighing function block for computing an output thereof based upon a respective weighing function.

7. A circuit according to claim 6, wherein the weighing function is based upon a sigmoidal function.

8. A circuit according to claim 6, wherein said at least one neuron comprises a plurality of neurons; and the circuit further comprises a multiplexer for applying respective weighing functions to said plurality of neurons.

9. A circuit according to claim 5, further comprising at least one output layer adder circuit for calculating the at least one output of said neural network from outputs of said at least one neuron.

10. A circuit according to claim 5, further comprising at least one additional input layer register for providing a feedback to said neural network of the at least one output therefrom.

11. A circuit according to claim 1, wherein said neural network comprises at least one neuron block for forming a linear combination of a respective input signal with a set of weights and bias values; and wherein said at least one neuron block comprises a product block, and an adder block implementing the linear combination recursively over a plurality of clock cycles.

12. A circuit according to claim 1, wherein said neural network comprises at least one neuron block for forming a linear combination of a respective input signal with a set of weights and bias values; and wherein said at least one neuron block comprises a plurality of product blocks implementing respective products of the at least one input signal with give weights, and an adder block simultaneously adding results of the products and the bias values.

13. A non-integer order proportional, integral and differential (PID) controller comprising:

a neural network for receiving at least one input signal and for generating therefrom at least one output signal, the at least one input and output signals being related to each other by a non-integer order integro-differential relationship through coefficients of said neural network;

a proportional block for adding to the at least one output signal an input signal component subject to a proportional weighing coefficient;

an integral block for adding to the at least one output signal a non-integer integral signal component subject to an integral weighing coefficient;

a first input register associated with said integral block for feeding an output of said integral block back to an input of said neural network;

a derivative block for adding to the at least one output signal a non-integer derivative signal component subject to a derivative weighing coefficient; and a second input register associated with said derivative block for feeding an output of said derivative block back to the input of said neural network.

14. A circuit according to claim 13, wherein the non-integer derivative signal component is obtained as an integer order dervative of a non-integer integral signal component generated by said integral block.

15. A circuit according to claim 13, further comprising an integral input port associated with said integral block for managing an external integral term.

16. A circuit according to claim 13, further comprising a derivative input port associated with said derivative block or managing an external derivative term.

17. A circuit according to claim 13, further comprising a memory for storing the coefficients of said neural network.

18. A circuit according to claim 13, further comprising:
at least one input layer register for receiving the input signal; and
at least one neuron comprising at least one adder block for calculating an input thereof based on the at least one input signal and a respective set of coefficients.

19. A circuit according to claim 18, wherein said at least one neuron comprises at least one weighing function block for computing an output thereof based upon a respective weighing function.

20. A circuit according to claim 19, wherein said at least one neuron comprises a plurality of neurons, the circuit further comprising a multiplexer for applying respective weighing functions to said plurality of neurons.

21. A circuit according to claim 18, further comprising at least one output layer adder circuit for calculating the at least one output of said neural network from outputs of said at least one neuron.

22. A circuit according to claim 18, further comprising at least one additional input layer register for providing a feedback to said neural network of the at least one output therefrom.

23. A circuit according to claim 13, wherein said neural network comprises at least one neuron block for forming a linear combination of a respective input signal with a set of weights and bias values, wherein said at least one neuron block comprises a product block, and an adder block implementing the linear combination recursively over a plurality of clock cycles.

24. A circuit according to claim 13, wherein said neural network comprises at least one neuron block for forming a linear combinaton of a respective input signal with a set of weights and bias values, wherein said at least one neuron block comprises a plurality of product blocks implementing respective products of the at least one input signal with given weights, and an adder block simultaneously adding results of the products and the bias values.

25. A system comprising:

a plurality of non-integer order proportional, integral and differential (PID) controllers connected together, each PID controller comprising a neural network for receiving at least one input signal and for generating therefrom at least one output signal, the at least one input and output signals being related to each other by a non-integer order integro-differential relationship through coefficients of said neural network, a proportional block for adding to the at least one output signal an input signal component subject to a proportional weighing coefficient, an integral block for adding to the at least one output signal a non-integer integral signal component subject to an integral weighing coefficient, a first input register associated with said integral block for feeding an output of said integral block back to an input of said neural network, a derivative block for adding to the at least one output signal a non-integer derivative signal component subject to a derivative weighing coefficent, and a second input register associated with said derivatve block for feeding an output of said derivatve block back to the input of said neural network;

at least one of said integral and derivative blocks in one of said plurality of PID controllers generating at least one respective output signal which is fed to at least one of said integal and derivative blocks in another PID controller.

26. A system according to claim 25, wherein the non-integer derivative signal component is obtained as an integer order derivative of a non-integer integral signal component generated by said respective integral block.

27. A system according to claim 25, wherein each PID controller further comprises an integral input port associated with said integral block for managing an external integral term.

28. A system according to claim 25, wherein each PID controller further comprises a derivative input port associated with said derivative block for managing an external derivative term.

29. A system according to claim 25, wherein each PID controller further comprises:
at least one input layer register for receiving the input signal; and
at least one neuron comprising at least one adder block for calculating an input thereof based on the at least one input signal and a respective set of coefficients.

30. A system according to claim 29, wherein said at least one neuron comprises at least one weighing function block for computing an output thereof based upon a respective weighing function.

31. A system according to claim 30, wherein said at least one neuron comprises a plurality of neurons, the circuit further comprising a multiplexer for applying respective weighing functions to said plurality of neurons.

32. A system according to claim 29, further comprising at least one output layer adder circuit for calculating the at least one output of said neural network from outputs of the at least one neuron.

33. A system according to claim 29, further comprising at least one additional input layer register for providing a feedback to said neural network of the at least one output therefrom.

34. A method for implementing a non-integer order dynamic system, the method comprising:

receiving at least one input signal using a neural network and generating therefrom at least one output signal, the at least one input and output signals being related to each other by a non-integer order integro-differential relationship through coefficients of said neural network.

35. A method according to claim 34, further comprising storing the coefficients of the neural network.

36. A method according to claim 34, wherein the neural network comprises:

at least one input layer register for receiving the input signal; and at least one neuron comprising at least one adder block for calculating an input thereof based on the at least one input signal and a respective set of coefficients.

37. A method according to claim 36, wherein the at least one neuron comprises at least one weighing function block for computing an output thereof based upon a respective weighing function.

38. A method according to claim 37, wherein the at least one neuron comprises a plurality of neurons; the method further comprising applying respective weighing functions to the plurality of neurons.

39. A method according to claim 36, the neural network comprising at least one output layer adder circuit for calculating the at least one output therefrom based upon outputs of the at least one neuron.

40. A method according to claim 39, further comprising providing a feedback to the neural network of the at least one output therefrom.

* * * * *

UNITED STATES PATENT AND TRADEMARK OFFICE
CERTIFICATE OF CORRECTION

PATENT NO. : 6,678,670 B2  
DATED : January 13, 2004  
INVENTOR(S) : Salvatore Abbisso et al.

Page 1 of 1

It is certified that error appears in the above-identified patent and that said Letters Patent is hereby corrected as shown below:

Column 2,  
Line 15, delete " $= \frac{1}{\Gamma(m)} \frac{d^n}{dt^n} \int_0^t (t-\tau)^{m-1} f(\tau) d\tau$ " insert -- $= \frac{1}{\Gamma(m)} \frac{d^n}{dt^n} \int_0^t (t-\tau)^{m-1} f(\tau) d(\tau)$ --

Column 4,  
Line 66, delete "-p/$^2$" insert -- -p/2 --

Column 6,  
Line 65, delete " $\left[ \frac{V(s,0)}{2} + \frac{I(s,0)}{2} \sqrt{\frac{r}{g+sc}} \right] e^{\sqrt{r(g+sc)}z}$ " Insert: -- $\left[ \frac{V(s,0)}{2} - \frac{I(s,0)}{2} \sqrt{\frac{r}{g+sc}} \right] e^{\sqrt{r(g+sc)}z}$ --

Column 7,  
Line 5, delete " $\left[ \frac{I(s,0)}{2} + \frac{V(s,0)}{2} \sqrt{\frac{g+sc}{r}} \right] e^{\sqrt{r(g+sc)}z}$ " insert -- $\left[ \frac{I(s,0)}{2} - \frac{V(s,0)}{2} \sqrt{\frac{g+sc}{r}} \right] e^{\sqrt{r(g+sc)}z}$ --

Column 11,  
Line 23, delete "(w$_j$ X$_i$)+b$_i$" insert -- $\Sigma$(w$_j$ X$_i$)+b$_i$ --

Column 13,  
Line 5, delete "with give" insert -- with given --

Signed and Sealed this

Twenty-fourth Day of August, 2004

JON W. DUDAS  
*Director of the United States Patent and Trademark Office*